United States Patent
Yokoyama

(10) Patent No.: US 12,288,541 B2
(45) Date of Patent: Apr. 29, 2025

(54) WIRELESS COMMUNICATION DEVICE, ELECTRONIC DEVICE, AND WIRELESS COMMUNICATION METHOD

(71) Applicant: Roland Corporation, Shizuoka (JP)

(72) Inventor: Hiroyuki Yokoyama, Shizuoka (JP)

(73) Assignee: Roland Corporation, Shizuoka (JP)

( * ) Notice: Subject to any disclaimer, the term of this patent is extended or adjusted under 35 U.S.C. 154(b) by 820 days.

(21) Appl. No.: 17/482,462

(22) Filed: Sep. 23, 2021

(65) Prior Publication Data
US 2022/0093068 A1 Mar. 24, 2022

(30) Foreign Application Priority Data
Sep. 24, 2020 (JP) ................................ 2020-159416

(51) Int. Cl.
*G10H 1/00* (2006.01)
(52) U.S. Cl.
CPC ......... *G10H 1/0083* (2013.01); *G10H 1/0066* (2013.01); *G10H 2240/211* (2013.01); *G10H 2240/221* (2013.01); *G10H 2240/311* (2013.01)
(58) Field of Classification Search
CPC ............... G10H 1/0083; G10H 1/0066; G10H 2240/211; G10H 2240/311;
(Continued)

(56) References Cited

U.S. PATENT DOCUMENTS 7,684,572 B2  3/2010 Ito
2003/0081603 A1* 5/2003 Rune .................... H04W 72/23
370/350
(Continued)

FOREIGN PATENT DOCUMENTS

JP 2005026862 1/2005
JP 2006287463 10/2006
(Continued)

OTHER PUBLICATIONS https://uobrep.openrepository.com/bitstream/handle/10547/337026/Faisal%20Qureshi%201.pdf?sequence=9&isAllowed=y (Year: 2014).*
(Continued)

*Primary Examiner* — Dedei K Hammond
*Assistant Examiner* — Philip G Scoles
(74) *Attorney, Agent, or Firm* — JCIPRNET

(57) ABSTRACT

The disclosure provides a wireless communication device, an electronic device, and a wireless communication method. A wireless communication device is connected to an electronic musical instrument and transmits and receives MIDI data input to and output from the electronic musical instrument to and from other wireless communication devices paired through wireless communication at a predetermined communication interval, the pair is formed with each of a plurality of the other wireless communication devices. The wireless communication device includes a communication interval setting part configured to set a communication interval of each pair to a different time interval; and a communication interval transmission part configured to transmit the communication intervals set by the communication interval setting part to the corresponding other wireless communication devices.

20 Claims, 13 Drawing Sheets

(58) Field of Classification Search
CPC ........ G10H 2240/221; G10H 2240/225; H04L 67/12; H04W 4/70
See application file for complete search history.

(56) References Cited

U.S. PATENT DOCUMENTS

2003/0121401 A1* 7/2003 Ito ........................ G10H 1/0083
84/625
2017/0213533 A1 7/2017 Hiroi et al.

FOREIGN PATENT DOCUMENTS

| | | |
|---|---|---|
| JP | 2007300509 | 11/2007 |
| JP | 2007020941 | 2/2009 |
| JP | 2012209960 | 10/2012 |
| JP | 2015179141 | 10/2015 |

OTHER PUBLICATIONS

CME Pro (https://www.youtube.com/watch?v=mEG56Dtcl6l, Apr. 2, 2020) (Year: 2020).*
TerrorBite (https://www.reddit.com/r/redstone/comments/4a20cz/comment/d0x4ak5/, Mar. 12, 2016) (Year: 2016).*
"Office Action of Europe Counterpart Application", issued on Sep. 29, 2022, pp. 1-6.
"Search Report of Europe Counterpart Application", issued on Feb. 16, 2022, pp. 1-10.

\* cited by examiner

FIG. 4(b)

GIVEN COMMUNICATION INTERVAL TABLE 51b

| No. | COMMUNICATION INTERVAL |
|---|---|
| 1 | 6 |
| 2 | 7 |
| 3 | 11 |
| 4 | 13 |

FIG. 4(c)

COMMUNICATION MANAGEMENT TABLE 52a

| No. | ID | CONNECTION STATE | CHANGE | CURRENT COMMUNICATION INTERVAL | INITIAL COMMUNICATION INTERVAL |
|---|---|---|---|---|---|
| 1 | 0 | DURING CONNECTION | POSSIBLE | 7 | 6 |
| 2 | 1 | DURING CONNECTION | POSSIBLE | 11 | 6 |
| 3 | 2 | NON-CONNECTION | NOT POSSIBLE | 0 | 0 |
| 4 | 3 | DURING CONNECTION | NOT POSSIBLE | 12 | 12 |

WIRELESS COMMUNICATION DEVICE, ELECTRONIC DEVICE, AND WIRELESS COMMUNICATION METHOD

CROSS-REFERENCE TO RELATED APPLICATION

This application claims the priority benefit of Japan application serial No. 2020-159416, filed on Sep. 24, 2020. The entirety of the above-mentioned patent application is hereby incorporated by reference herein and made a part of this specification.

BACKGROUND

Technical Field

The disclosure relates to a wireless communication device, an electronic device, and a wireless communication method.

Description of Related Art

Patent Document 1 discloses a dongle device 1 for audio-music devices (a wireless communication device) connected to an audio-music device 2. The dongle device 1 for audio-music devices includes a wireless part 20, the wireless part 20 wirelessly transmits and receives a MIDI type signal (MIDI data) to and from a portable electronic device 8 (another wireless communication device), and the transmitted and received MIDI type signal is input to and output from the audio-music device 2, so that the MIDI type signal can be wirelessly communicated between the audio-music device 2 and the portable electronic device 8. Since the dongle device 1 for audio-music devices and the portable electronic device 8 perform wireless communication at a predetermined communication interval (for example, 6 milliseconds (ms)), the MIDI type signal can be transmitted and received without delay.

PATENT DOCUMENTS

[Patent Document 1] Japanese Patent Laid-Open No. 2015-179141 (for example, FIGS. 1 and 2)

Incidentally, one wireless communication device in which a slave mode is set (hereinafter referred to as a "slave") and a plurality of wireless communication devices in which a master mode is set (hereinafter referred to as "masters") are provided, the slave and each one of the plurality of masters are paired, respectively, MIDI data is transmitted and received in each pair in some cases. Since only one antenna performing wireless communication is provided in the slave, the slave can simultaneously perform the wireless communication with only one master. Accordingly, for the slave to perform wireless communication with the plurality of masters of each pair, it is necessary to perform time division and shifting on a timing for the wireless communication with each master. As a scheme for this, for example, timings at which wireless communication starts in each pair may be staggered. Thereafter, each pair performs the wireless communication at a predetermined communication interval. Thus, it is possible to prevent the timings at which the plurality of pairs perform the wireless communication from coinciding with each other.

Here, in each wireless communication device, clocks of a CPU are each individually provided and timings at which wireless communication is performed are determined by the clocks. An interval of the clocks is substantially the same, but there is an individual difference. Therefore, the interval of the clocks of each wireless communication device is not synchronized. Accordingly, when timings at which wireless communication starts in each pair may be staggered, a deviation also occurs at the timing at which the wireless communication of each pair is performed due to the individual difference in the interval of the clocks. Thus, the timing at which the wireless communication is performed in one pair coincides with the timings at which the wireless communication is performed in the other pairs in some cases.

In this case, MIDI data is simultaneously transmitted from the plurality of masters to the slave. As described above, the slave can simultaneously perform wireless communication with only one master. Therefore, when the timings at which the wireless communication is performed in the plurality of pairs coincide with each other, the MIDI data cannot be received from one master while the MIDI data can be received from the other masters. Thus, a communication error arises with the other masters. Further, when the communication interval is set to be the same in each pair and once the timings at which the wireless communication is performed in the plurality of pairs coincide with each other, timings at which the subsequent wireless communication is performed may coincide with each other in succession from now on. Thus, a communication error continues to arise and there is concern of delay in transmission and reception of the MIDI data.

SUMMARY

According to an embodiment, a wireless communication device is connected to an electronic musical instrument and transmits and receives MIDI data input to and output from the electronic musical instrument to and from other wireless communication devices paired through wireless communication at a predetermined communication interval. A pair is formed with each of a plurality of the other wireless communication devices. The wireless communication device includes: a communication interval setting part configured to set a communication interval of each pair to a different time interval; and a communication interval transmission part configured to transmit the communication intervals set by the communication interval setting part to the corresponding other wireless communication devices.

According to an embodiment, an electronic device includes the wireless communication device according to the embodiment.

According to another embodiment, a wireless communication method is performed by a wireless communication device that is connected to an electronic musical instrument and transmits and receives MIDI data input to and output from the electronic musical instrument to and from other wireless communication devices paired through wireless communication at a predetermined communication interval. The pair is formed with each of a plurality of the other wireless communication devices. The method includes: setting a communication interval of each pair to a different time interval; and transmitting the communication interval set to the corresponding other wireless communication devices.

According to another embodiment, there is provided a wireless communication device that is a first wireless communication device that is connected to a first electronic musical instrument and transmits and receives MIDI data input to and output from the electronic musical instrument at a predetermined communication interval through wireless communication, wherein the first wireless communication device being connected to a second wireless communication device that is connected to a second electronic musical instrument and transmits and receives MIDI data input to and output from the electronic musical instrument to and from the first wireless communication device at a predetermined communication interval through wireless communication, and the first wireless communication device being connected to a third wireless communication device that is connected to a third electronic musical instrument and transmits and receives MIDI data input to and output from the electronic musical instrument to and from the first wireless communication device at a predetermined communication interval through wireless communication, and wherein the wireless communication device comprises: a communication interval setting part configured to set the communication interval between the first and second wireless communication devices and the communication interval between the first and third wireless communication devices to different time intervals; and a communication interval transmission part configured to transmit the communication intervals set by the communication interval setting part to the corresponding second and third wireless communication devices.

BRIEF DESCRIPTION OF THE DRAWINGS

FIG. 4(b) is a diagram schematically illustrating a given communication interval table, and FIG. 4(c) is a diagram schematically illustrating a communication management table.

DESCRIPTION OF THE EMBODIMENTS

According to an embodiment of the disclosure, the disclosure provides a wireless communication device, an electronic device, and a wireless communication method capable of transmitting and receiving MIDI data without delay by preventing timings for transmission and reception from coinciding with each other even when the MIDI data is transmitted and received with a plurality of other wireless communication devices.

Figure 1A:
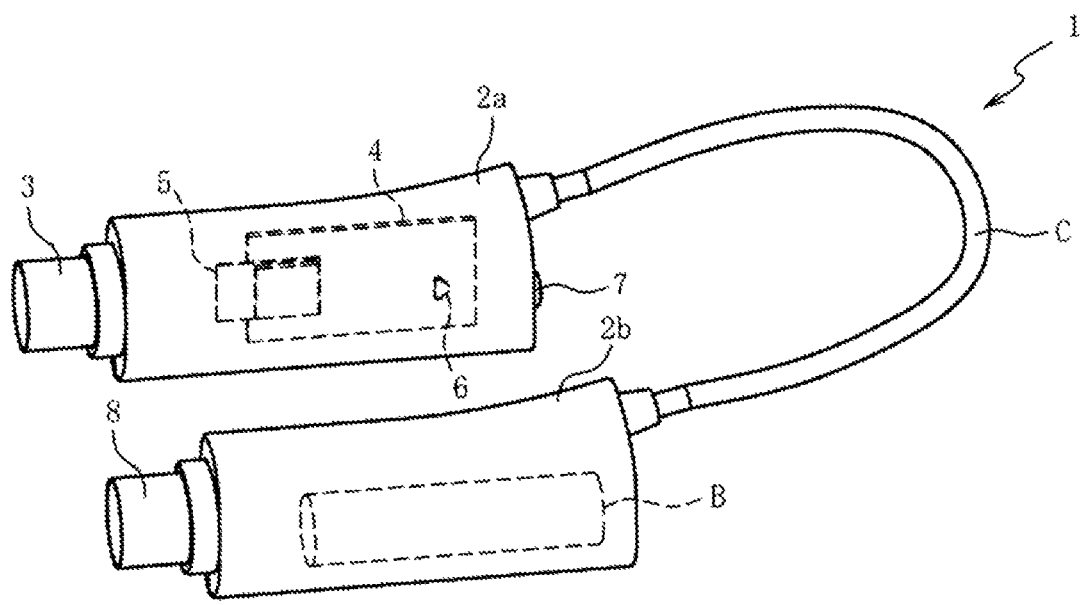
FIG. 1(a) is an external view illustrating a wireless communication device according to an embodiment and FIG. 1(b) is a diagram illustrating wireless communication devices connected to electronic musical instruments.
Figure 1B:
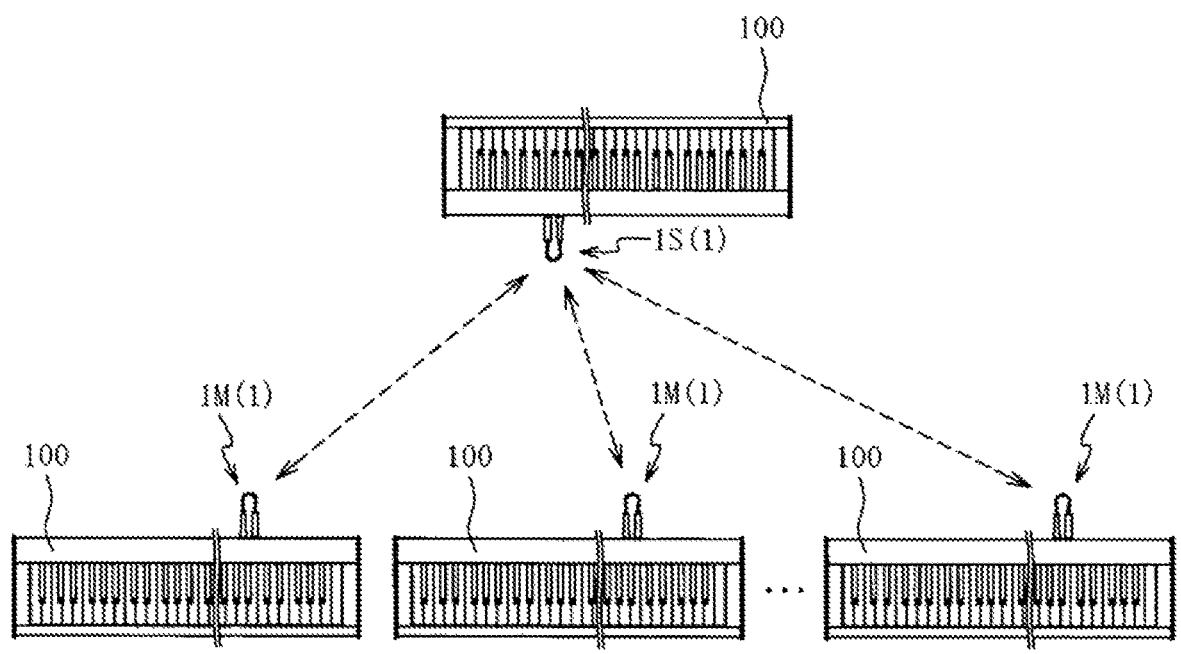

Hereinafter, preferred embodiments will be described with reference to the appended drawings. An overview of a wireless communication device 1 according to an embodiment will be described with reference to FIG. 1. FIG. 1(a) is an external view illustrating a wireless communication device 1 and FIG. 1(b) is a diagram illustrating wireless communication devices 1 connected to electronic musical instruments 100.

The wireless communication device 1 is a device (an electronic musical communication device) that is connected to an electronic musical instrument 100 which is an electronic device such as a synthesizer and transmits and receives musical instrument digital interface (MIDI) data input to and output from the electronic musical instrument 100 through wireless communication.

In the wireless communication device 1, casings 2a and 2b formed of a semi-transparent resin are provided. An input terminal 3, a control part 4 that controls each part of the wireless communication device 1, a wireless module 5 that performs wireless communication, an LED 6, and an operation button 7 to which an instruction from a user is input are provided in the casing 2a. The input terminal 3 is a terminal which is connected to a MIDI output terminal 102 (see FIG. 4(a)) of the electronic musical instrument 100 and to which MIDI data output from the MIDI output terminal 102 is input. The LED 6 is an output device that turns on and off light.

A battery B that supplies power to each part of the wireless communication device 1 and an output terminal 8 are provided in the casing 2b. The output terminal 8 is a terminal that is connected to a MIDI input terminal 103 (see FIG. 4(a)) of the electronic musical instrument 100 and outputs the MIDI data to the MIDI input terminal 103. The casings 2a and 2b are connected with a cable C and power or data is input and output between the casings 2a and 2b via the cable C. For example, power from the battery B of the casing 2b is supplied to the casing 2a via the cable C and the MIDI data received from the wireless module 5 of the casing 2a is output to the output terminal 8 of the casing 2b via the cable C.

In the embodiment, since one antenna (not illustrated) is provided in the wireless module 5, the wireless communication device 1 can simultaneously transmit and receive the MIDI data to and from one of the other wireless communication devices 1. The wireless module 5 is not limited to the configuration in which one antenna is provided, but two or more antennas may be provided.

The plurality of other wireless communication devices 1 is connected to the wireless communication device 1. The wireless communication device 1 and each of the other wireless communication devices 1 are paired. The wireless communication device 1 transmits the MIDI data input from the electronic musical instrument 100 to the paired other wireless communication device 1 through wireless communication and outputs the MIDI data received through the wireless communication from the paired other wireless communication device 1 to the electronic musical instrument 100. Thus, the MIDI data can be transmitted and received between the electronic musical instrument 100 connected to the wireless communication device 1 and the electronic musical instrument 100 connected to the other wireless communication device 1. Hereinafter, a pair of the wireless communication device 1 and the other wireless communication device 1 is abbreviated to simply the "pair."

Two communication modes, a "master mode" and a "slave mode" are set in the pair of wireless communication devices 1. Specifically, the master mode is a communication mode in which an instruction is mainly given to the wireless communication device 1 in the slave mode. The slave mode is a communication mode in which an instruction is given from the wireless communication device 1 in the master mode and a response to the instruction is transmitted to the wireless communication device 1 in the master mode. Hereinafter, the wireless communication device 1 in which the master mode is set is referred to as a "wireless communication device 1M" and the wireless communication device 1 in which the slave mode is set is referred to as a "wireless communication device 1S."

In the pair of wireless communication devices 1, the wireless communication device 1M first transmits the MIDI data to the wireless communication device 1S, and the wireless communication device 1S receives the MIDI data from the wireless communication device 1M and transmits the MIDI data to the wireless communication device 1M. Thus, since the pair do not simultaneously communicate with each other, the MIDI data can be reliably transmitted and received efficiently by the pair.

In the embodiment, the plurality of wireless communication devices 1M is connected to one wireless communication device 1S, and the MIDI data is transmitted and received at a predetermined communication interval in each one-to-one pair of wireless communication device 1S and wireless communication device 1M. As will be described below in detail, in the embodiment, the communication interval of each pair is set to a different time interval. Thus, it is possible to prevent a communication error from repeatedly occurring in succession because timings for transmission and reception of the MIDI data in the plurality of pairs coincide with each other. Next, a communication timing of the MIDI data of each pair will be described with reference to FIG. 2.

Figure 2A:
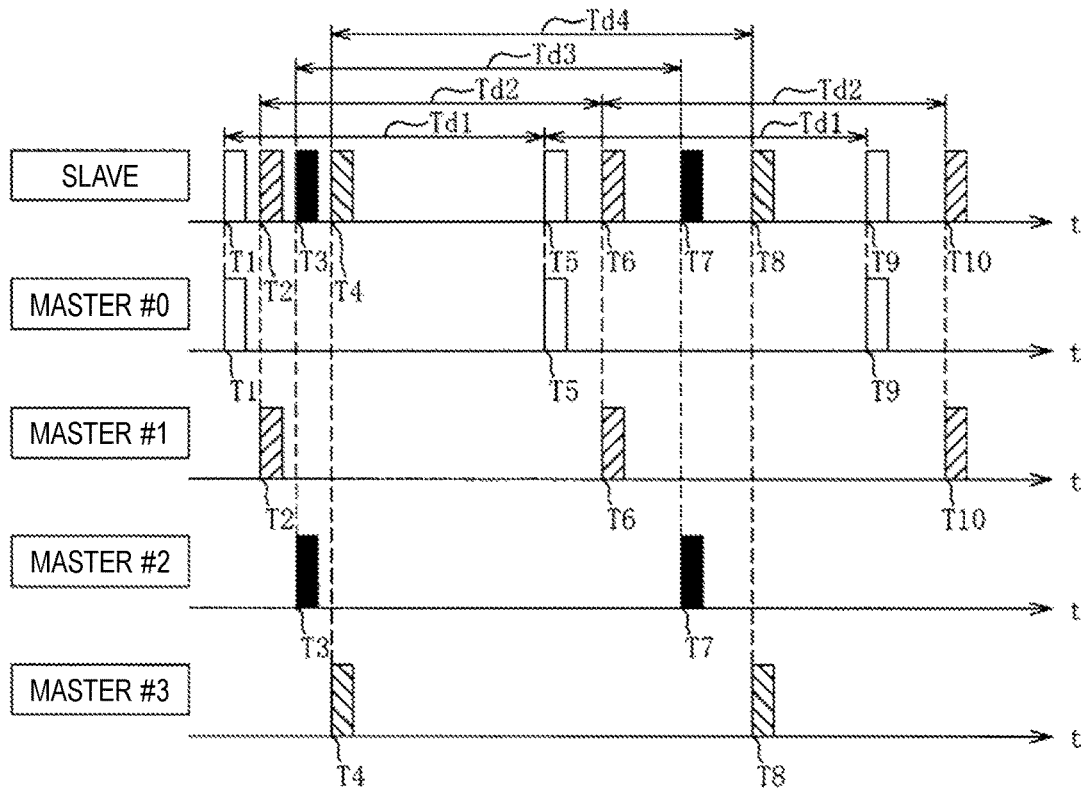
FIG. 2(a) is a diagram illustrating a communication timing of each pair and FIG. 2(b) is a diagram illustrating a communication timing of each pair when timings for transmission and reception coincide with each other.
Figure 2B:
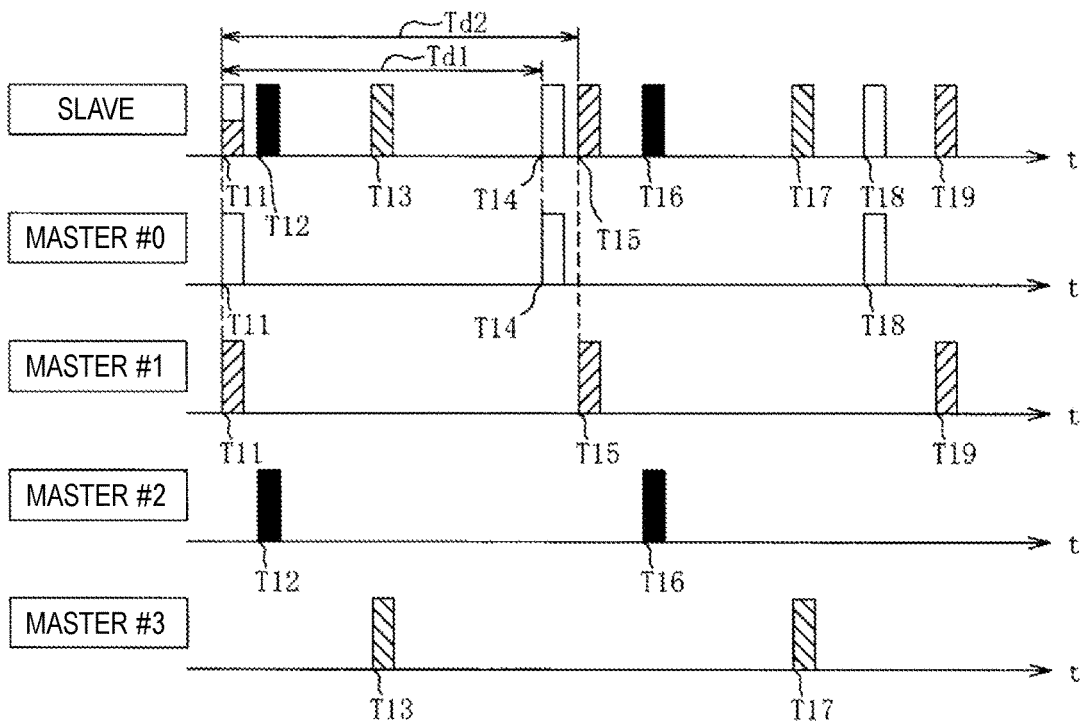

FIG. 2(a) is a diagram illustrating a communication timing of each pair. FIGS. 2(a) and 2(b) are diagrams in which a "slave" is given to a communication timing of the wireless communication device 1S and "masters #0 to #3" are given to communication timings of four wireless communication devices 1M paired with the wireless communication device 1S. Hereinafter, in FIGS. 2(a) and 2(b), the wireless communication device 1S is referred to as a "slave" and the four wireless communication devices 1M are respectively referred to as "masters #0 to #3."

In FIGS. 2(a) and 2(b), timings for transmission and reception in the slave and the master #0 are indicated by an outlined rectangle, timings for transmission and reception in the slave and the master #1 are indicated by a hatched rectangle with diagonal lines rising up to the right, timings for transmission and reception in the slave and the master #2 are indicated by a black rectangle, and timings for transmission and reception in the slave and the master #3 are indicated by a hatched rectangle with diagonal lines rising up to the left.

In FIG. 2(a), the slave shifts a wireless communication timing in sequence from the masters #0 to #3 to transmit and receive the MIDI data to and from the four masters #0 to #3. Specifically, at a time T1, the pair of slave and master #0 transmits and receives the MIDI data. At a time T2 subsequent to the time T1, the pair of slave and master #1 transmits and receives the MIDI data. At a time T3 subsequent to the time T2, the pair of slave and master #2 transmits and receives the MIDI data. At a time T4 subsequent to the time T3, the pair of slave and master #3 transmits and receives the MIDI data.

Thereafter, each pair transmits and receives the MIDI data at each set communication interval. That is, the pair of slave and master #0 transmits and receives the MIDI data at a time T5 after a time Td1 from the time T1. The pair of slave and master #1 transmits and receives the MIDI data at a time T6 after a time Td2 from the time T2. The pair of slave and master #2 transmits and receives the MIDI data at a time T7 after a time Td3 from the time T3. The pair of slave and master #3 transmits and receives the MIDI data at a time T8 after a time Td4 from the time T4.

In the embodiment, the times Td1 to Td4 which are communication intervals of the MIDI data set in each pair are different time interval and increase in order from the time Td1 to the time Td4, that is, time Td1<time Td2<time Td3<time Td4. Thus, compared to a case in which the times Td1 to Td4 are the same time interval, timings at which the MIDI data is transmitted and received in each pair can be shifted. Thus, it is possible to prevent a communication error from occurring because timings for transmission and reception of the MIDI data in the plurality of pairs coincide with each other.

Figure 4A:
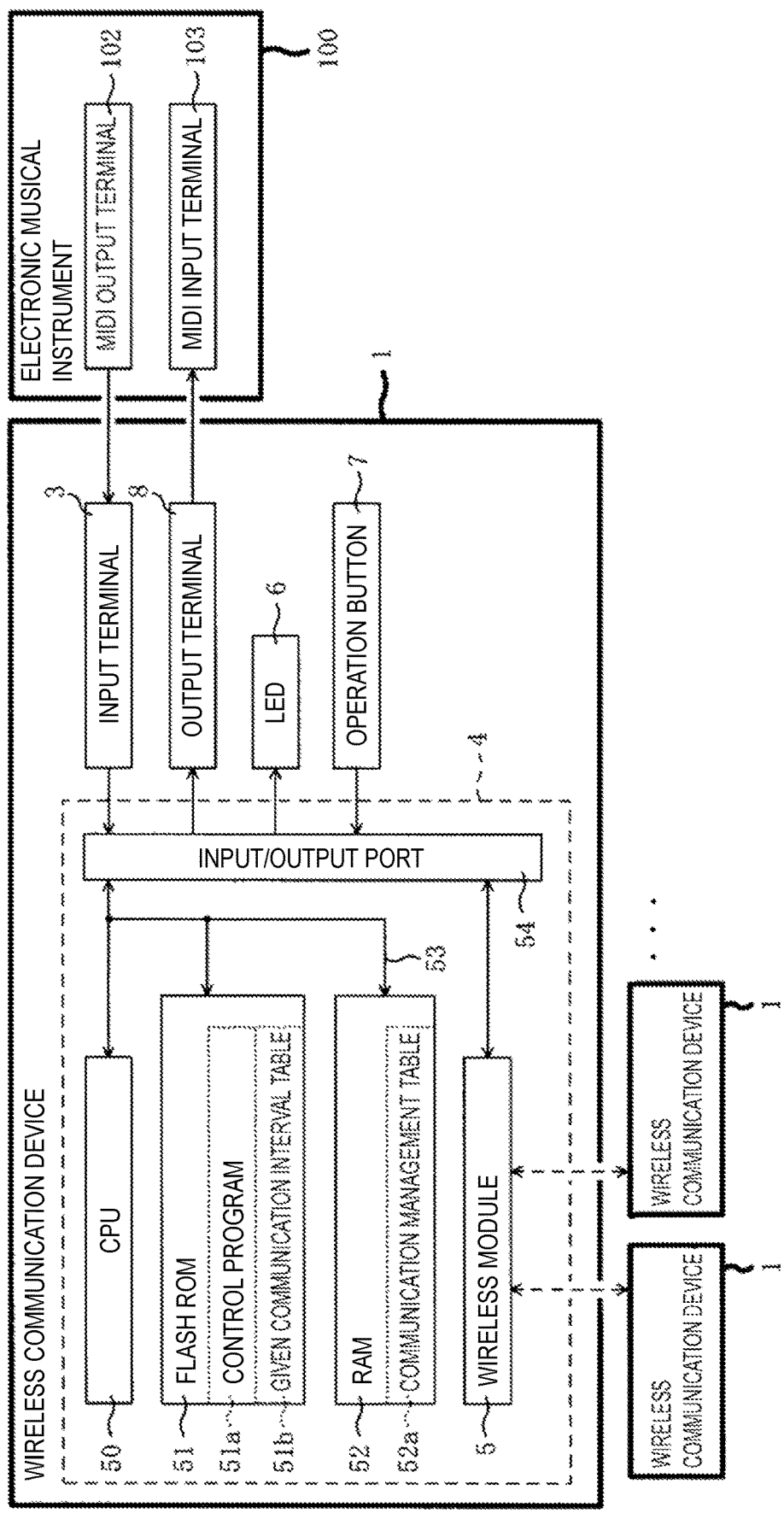
FIG. 4(a) is a block diagram illustrating an electrical configuration of the wireless communication device.

Here, timings at which the MIDI data is transmitted and received in each wireless communication device 1 are determined in accordance with a clock (not illustrated) embedded in the CPU 50 (see FIG. 4(a)). The intervals of the clock are not substantially the same and there are individual differences therein. Therefore, intervals of the clock of each wireless communication device 1 are not synchronized. Accordingly, as described above, when the pairs of slave and masters #0 to #3 in which the different communication intervals are set continuously transmit and receive the MIDI data for a long time, the timings of the clocks between the wireless communication devices 1 may match and the timings for transmission and reception in the plurality of pairs coincide with each other in some cases. When a communication failure occurs in wireless communication and timings for transmission and reception are staggered, timings for the transmission and reception in the plurality of pairs also coincide with each other in some cases. An operation in which the timings for transmission and reception in the plurality of pairs coincide with each other will be described with reference to FIG. 2(b).

FIG. 2(b) is a diagram illustrating a communication timing of each pair when timings for transmission and reception coincide with each other. FIG. 2(b) illustrates a case in which, at a time T11, a timing for transmission and reception in the pair of slave and master #0 coincides with a timing for transmission and reception in the pair of slave and master #1. As described above, the wireless communication device 1 simultaneously transmits and receives the MIDI data to and from one of the other wireless communication devices 1. Accordingly, while the slave can receive the MIDI data of one master between the masters #0 and #1 simultaneously transmitting the MIDI data, the slave cannot receive the MIDI data of the other master. Thus, a communication error occurs with the other masters.

In this way, immediately after the communication error occurs with the other masters, a timing for transmission and reception in the pair of slave and master #0 is a time T14 after the time Td1 from a time T11 and a subsequent timing for transmission and reception in the pair of slave and master #1 is a time T15 after the time Td2 from a time T11. Here, since a time interval longer than the time Td1 is set for the time Td2, the time T15 is a timing later than the time T14.

Thus, at the time T14, the pair of slave and master #0 transmits and receives the MIDI data. Later, at the time T15, the pair of slave and master #1 transmits and receives the MIDI data. That is, when the timings for transmission and reception of the MIDI data in two or more pairs coincide with each other, subsequent timings for transmission and reception can be different timings in the pairs. Thus, it is possible to prevent the communication error from occurring in succession because the timings for transmission and reception in two or more pairs coincide with each other. Therefore, the MIDI data can be transmitted and received without delay.

Figure 3:
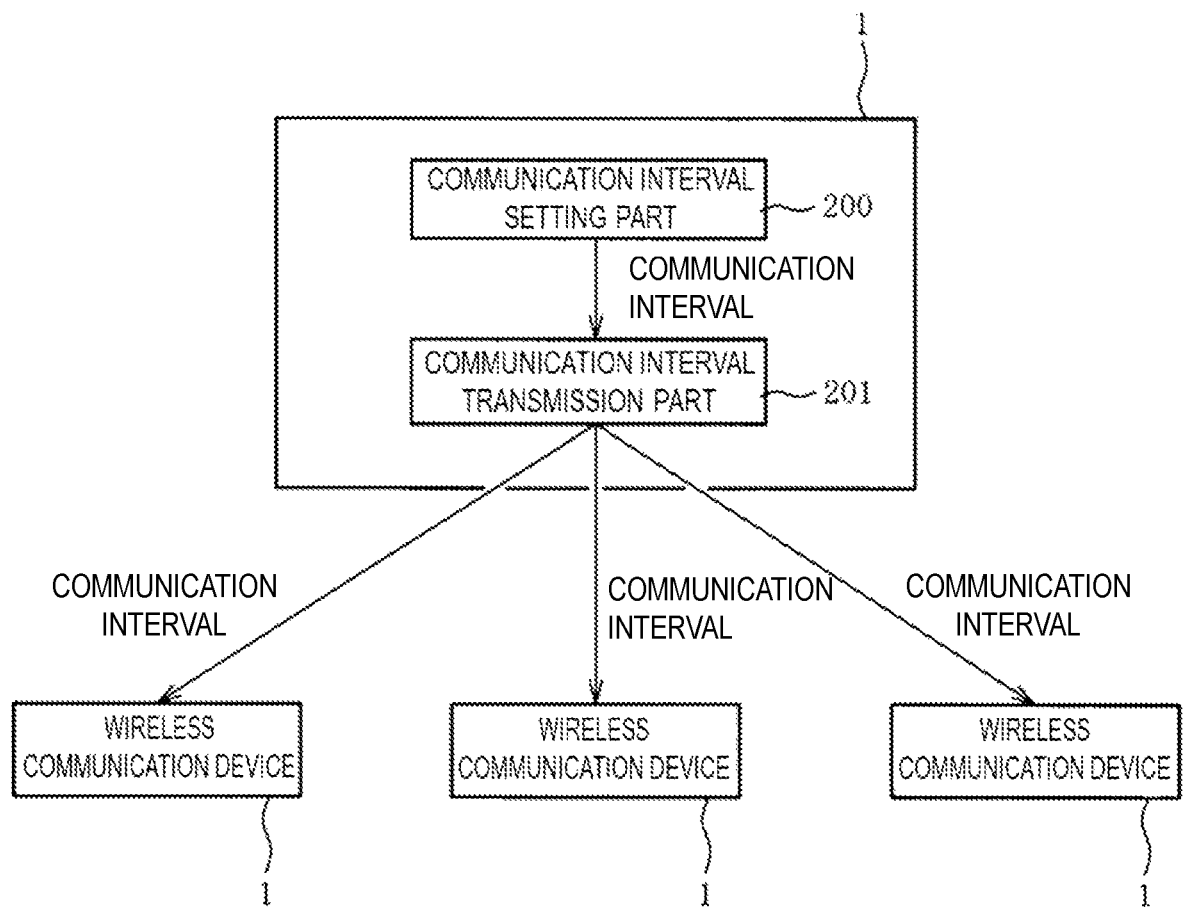
FIG. 3 is a functional block diagram illustrating the wireless communication device.

Next, a function of the wireless communication device 1 will be described with reference to FIG. 3. FIG. 3 is a functional block diagram of the wireless communication device 1. As illustrated in FIG. 3, the wireless communication device 1 includes a communication interval setting part 200 and a communication interval transmission part 201. The communication interval setting part 200 is a part that sets communication intervals of the pairs with the other wireless communication devices 1 to different time intervals and is realized by the CPU 50 to be described below in FIG. 4(*a*). The communication interval transmission part 201 is a part that transmits the communication intervals set by the communication interval setting part 200 to the corresponding other wireless communication devices 1 and is realized by the CPU 50 and the wireless module 5.

In the wireless communication device 1, the communication intervals of the pairs with the other wireless communication devices 1 are set to different time intervals and are transmitted to the corresponding other wireless communication devices 1. Accordingly, since the communication intervals of the pairs with the other wireless communication devices 1 can be different, the timings for transmission and reception of the MIDI data in the pairs with the other wireless communication devices 1 can be shifted. Thus, it is possible to prevent a communication error from occurring because the timings for transmission and reception of the MIDI data in the plurality of pairs of other wireless communication devices 1 coincide with each other.

When the timings for transmission and reception of the MIDI data in two or more pairs coincide with each other, subsequent timings for transmission and reception can be different timings in the pairs. Thus, since it is possible to prevent the communication error from repeatedly occurring in succession because the timings for transmission and reception of in the two or more pairs coincide with each other, it is possible to transmit and receive the MIDI data without delay.

Next, an electrical configuration of the wireless communication device 1 will be described with reference to FIG. 4. FIG. 4(*a*) is a block diagram illustrating the electrical configuration of the wireless communication device 1. The wireless communication device 1 includes the foregoing control part 4 and the control part 4 includes the CPU 50, a flash ROM 51, and a RAM 52, which are connected to an input/output port 54 via a bus line 53. The foregoing wireless module 5, input terminal 3, output terminal 8, LED 6, and operation button 7 are further connected to the input/output port 54.

Figure 5:
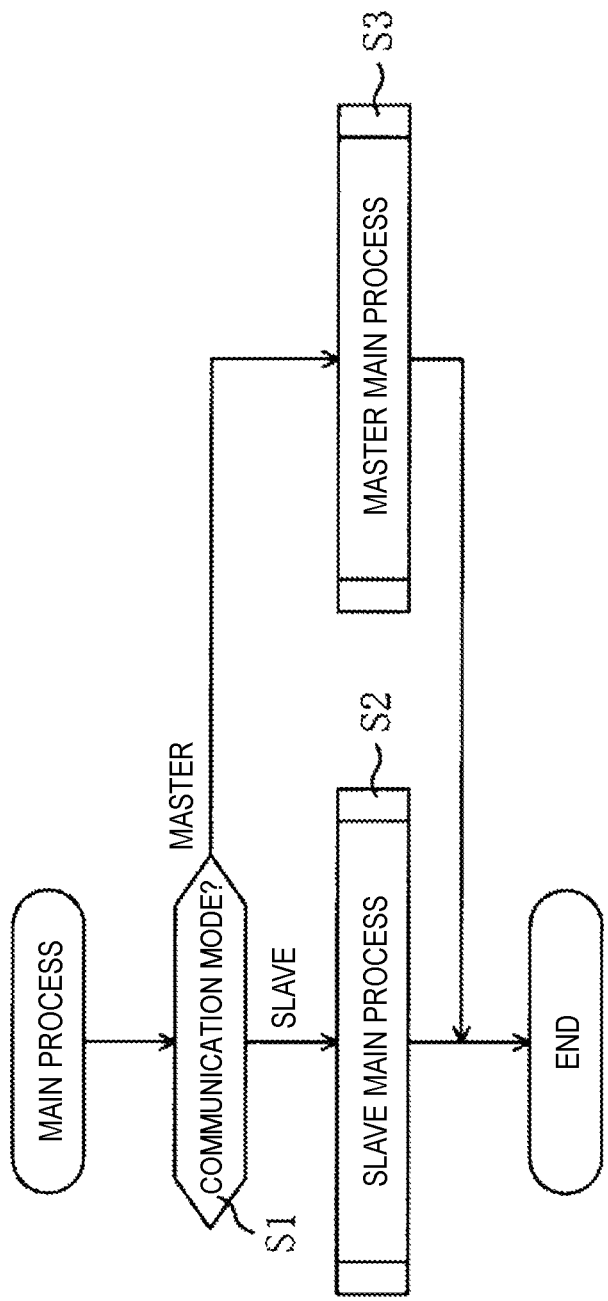
FIG. 5 is a flowchart illustrating a main process.

The CPU 10 is an arithmetic device that controls each part connected via the bus line 53. The flash ROM 51 is a rewritable nonvolatile storage device that stores a program executed by the CPU 10, fixed value data, and the like and stores a control program 51*a* and a given communication interval table 51*b* in which given values of communication intervals set in the pairs are stored. When the CPU 50 executes the control program 51*a*, a main process of FIG. 5 is performed. Next, the given communication interval table 51*b* will be described with reference to FIG. 4(*b*).

FIG. 4(*b*) is a diagram schematically illustrating the given communication interval table 51*b*. In the given communication interval table 51*b*, a communication interval in which a "change" is "possible" and which is used in the pair with the wireless communication device 1M is stored. That is, in the communication management table 52*a* to be described below, any communication interval stored in the given communication interval table 51*b* is set as a current communication interval of the wireless communication device 1M in which a "change" is "possible."

In the given communication interval table 51*b*, 6 ms, 7 ms, 11 ms, and 13 ms are stored as the communication intervals. Of the communication intervals, 6 ms is an initial communication interval of the wireless communication device 1 in which a "change" is "possible." In the wireless communication device 1M in which a "change" is "possible," the initial communication interval is a shortest communication interval. Therefore, since the initial communication interval can be set as a communication interval, a number of times of transmission and reception of the MIDI data per unit time can be increased. Thus, it is possible to quickly transmit and receive the MIDI data.

In the given communication interval table 51*b*, communication intervals based on prime numbers such as 7 ms, 11 ms, and 13 ms are stored. When the communication intervals are based on prime numbers, prime factors between the communication intervals set in the pairs can be easily caused to be different. Thus, a least common multiple between the communication intervals based on the prime numbers is greater than a least common multiple between communication intervals including the same prime factor. Accordingly, when the plurality of pairs starts transmitting and receiving the MIDI data at the same timing, a long time is necessary until the transmission and reception of any of the pairs become the same timing. Thus, it is possible to appropriately prevent a communication error from occurring because the timings for transmission and reception in the plurality of pairs coincide with each other.

The communication intervals based on prime numbers stored in the given communication interval table 51*b* are not limited to 7 ms, 11 ms, and 13 ms. Communication intervals based on prime numbers other than these communication intervals may be stored as long as the communication intervals are longer than the initial communication interval (6 ms) of the wireless communication device 1.

In the given communication interval table 51*b*, 6 ms, 7 ms, 11 ms, and 13 ms are stored as the communication intervals in an increasing order of time interval. Thus, since the communication intervals are set in the increasing order of the communication intervals from the given communication interval table 51*b*, the communication interval of each pair can be set to a time interval which is as small as possible. Thus, since a frequency at which the MIDI data is transmitted and received per unit time increases, the MIDI data to be transmitted and received quickly.

The process returns to FIG. 4(*a*). The RAM 52 is a memory in which various pieces of work data, flags, or the like are stored in a rewritable manner when the CPU 50 executes the control program 51*a*. A communication management table 52*a* in which a communication interval or the like set for each pair is stored is provided. The communication management table 52*a* will be described with reference to FIG. 4(*c*).

FIG. 4(*c*) is a diagram schematically illustrating the communication management table 52*a*. In the communication management table 52*a*, for each wireless communication device 1S, an "ID," a "change," a "connection state" indicating whether there is connection to the wireless communication device 1M, a "current communication interval"

(unit: milliseconds (ms)) which is a communication interval used to transmit and receive the MIDI data to and from the wireless communication device 1M, and an "initial communication interval" (unit: ms) which is an initial value of the communication interval set in the wireless communication device 1M are stored in association.

The ID is a unique identifier set in the wireless communication device 1M. One of 0 to 3 is set in advance as the ID of the wireless communication device 1M. That is, in the embodiment, the number of wireless communication devices 1M paired with the wireless communication device 1S is up to four. The number of wireless communication devices 1M is not limited to four, and may be four or more or four or less.

For the "change," whether the communication interval is changeable in the wireless communication device 1M is stored. For the wireless communication devices 1M, the communication interval may be changeable or unchangeable is included. In the "change," "possible" is stored for the wireless communication device 1M in which the communication interval is changeable and "not possible" is stored for the wireless communication device 1M in which the communication interval is unchangeable.

In the embodiment, for the wireless communication device 1S, the wireless communication device 1 in which "change" is "possible" is used. For the wireless communication device 1M, the wireless communication device 1 in which "change" is "possible" or "not possible" is used. For the pair with the wireless communication device 1M in which "change" is "possible," the communication interval stored in the given communication interval table 51b to be described below may be conceived to be a communication interval used to transmit and receive the MIDI data. For the pair with the wireless communication device 1M in which "change" is "not possible," the communication interval set in advance in the wireless communication device 1M (that is, the initial communication interval of the communication management table 52a) is considered to be a communication interval used to transmit and receive the MIDI data.

In the embodiment, the initial communication interval of the wireless communication device 1 in which "change" is "possible" is considered to be 6 ms and the initial communication interval of the wireless communication device in which "change" is "not possible" is considered to be any of 6 ms, 9 ms, and 12 ms. The initial communication interval of the wireless communication device is not limited to 6 ms, 9 ms, and 12 ms, and may be equal to or greater than these communication intervals or may be equal to or less than these communication intervals.

Initial values of the connection state, the change, the current communication interval, and the initial communication interval of the communication management table 52a are "non-connection," "not possible," "0 ms," and "0 ms." These initial values are set immediately after the wireless communication device 1 is powered on or when the pairs with the other wireless communication devices 1 are cancelled.

Next, a main process performed by the CPU 50 of the wireless communication device 1 will be described with reference to FIGS. 5 to 11. FIG. 5 is a flowchart of the main process. The main process is a process performed after the wireless communication device 1 is powered on.

In the main process, a communication mode set in the wireless communication device 1 is first checked (S1). In the process of S1, when the communication mode is the slave mode (S1: slave), a slave main process is performed (S2). Here, the slave main process will be described with reference to FIG. 6.

Figure 6:
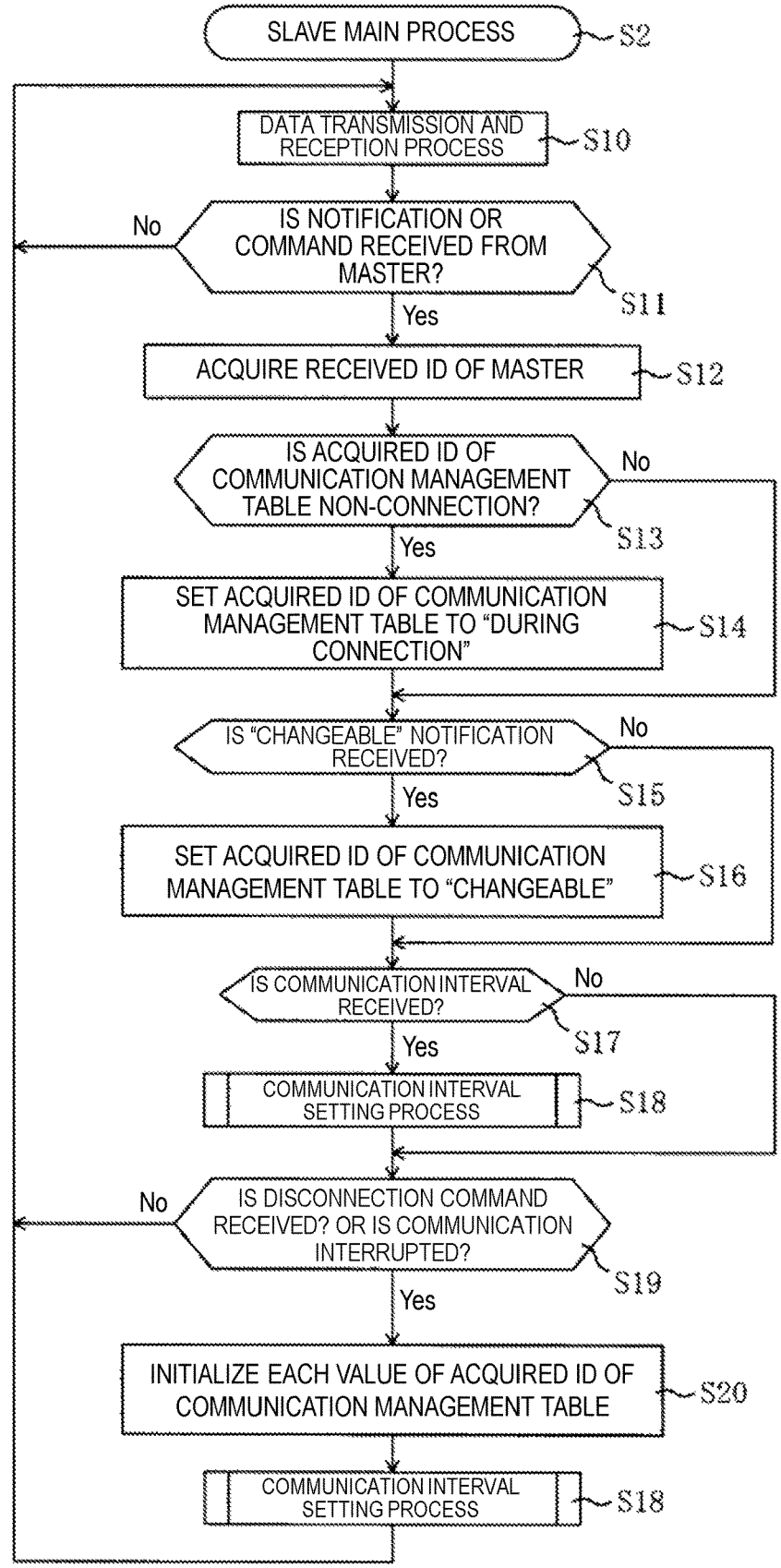
FIG. 6 is a flowchart illustrating a slave main process.

FIG. 6 is a flowchart of the slave main process. In the slave main process, a data transmission and reception process is first performed (S10). In the data transmission and reception process, the MIDI data received from the wireless communication device 1M is transmitted to the MIDI input terminal 103 of the electronic musical instrument 100 via the output terminal 8. The MIDI data received from the MIDI output terminal 102 of the electronic musical instrument 100 via the input terminal 3 is stored in a transmission buffer (not illustrated) provided for each pair. The MIDI data stored in the transmission buffer is transmitted to the paired wireless communication device 1M corresponding to the transmission and reception process performed at each communication interval with each pair. In the data transmission and reception process, a notification or a command from the wireless communication device 1M other than the MIDI data is also transmitted and received.

After the data transmission and reception process of S10, it is checked whether the notification or the command is received from the wireless communication device 1M through the data transmission and reception process (S11). When the notification or the command is received from the wireless communication device 1M in the process of S11 (Yes in S11), the ID of the wireless communication device 1M received along with the notification or the command is acquired (S12).

After the process of S12, with regard to the acquired ID, it is checked whether the connection state of the corresponding ID is "non-connection" with reference to the communication management table 52a (S13). When the connection state of the corresponding ID of the communication management table 52a is "non-connection" in the process of S13 (Yes in S13), a notification or a command is received from the newly connected wireless communication device 1M, and therefore the connection state of the corresponding ID of the communication management table 52a is set to "during connection" (S14). Conversely, when the connection state of the corresponding ID of the communication management table 52a is "during connection" in the process of S13 (No in S13), the process of S14 is skipped.

After the processes of S13 and S14, it is checked whether a "changeable" notification for notifying that the device can change the communication interval is received from the wireless communication device 1M (S15). The "changeable" notification is notified of by the wireless communication device 1M through the process of S111 of a post-connection process to be described below (FIG. 11(a)). When the "changeable" notification is received in the process of S15 (Yes in S15), "change" of the ID acquired in the process of S12 in the communication management table 52a is set to "changeable" (S16). Conversely, when the "changeable" notification is not received in the process of S15 (No in S15), the process of S16 is skipped.

After the processes of S15 and S16, it is checked whether the communication interval is received from the wireless communication device 1M (S17). When the communication interval is received in the process of S17 (Yes in S17), a communication interval setting process (S18) is performed. Here, the communication interval setting process will be described with reference to FIG. 7(a).

Figure 7A:
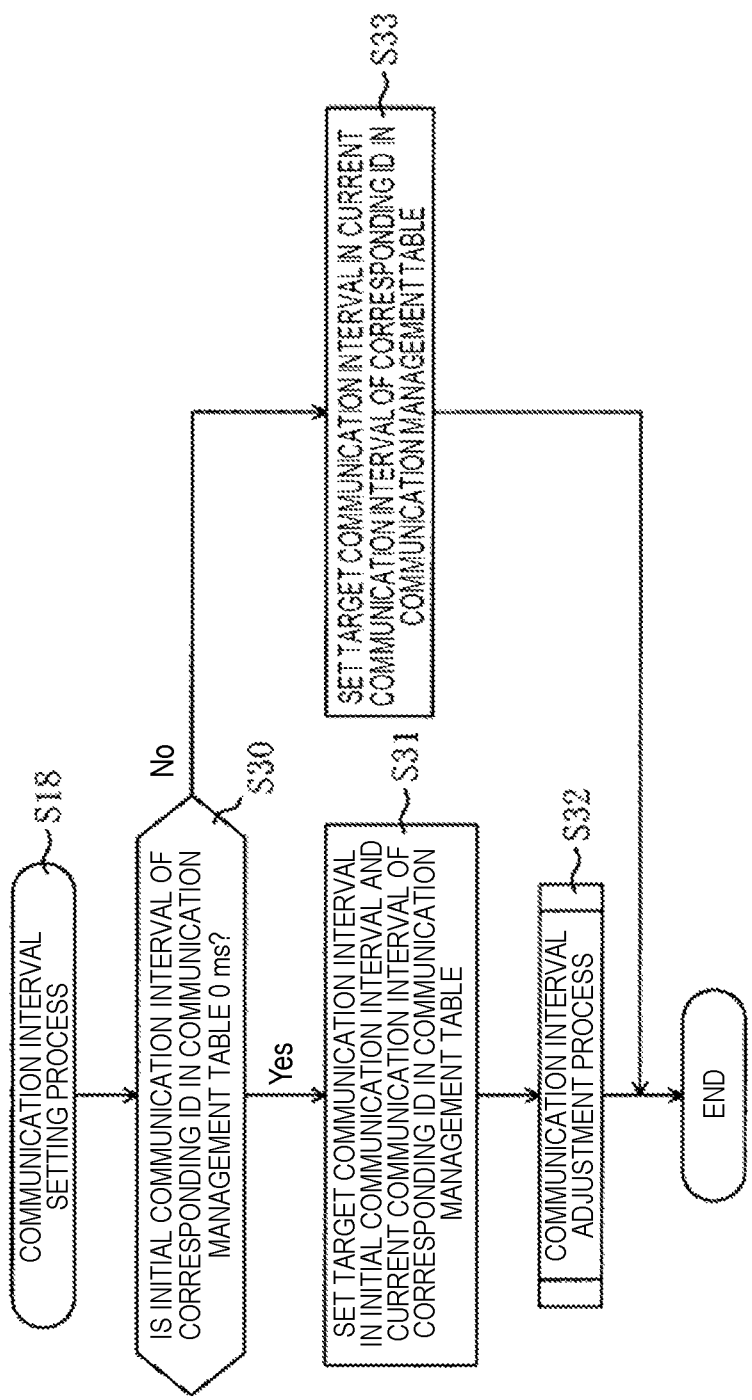
FIG. 7(a) is a flowchart illustrating a communication interval setting process and FIG. 7(b) is a flowchart illustrating a communication interval adjustment process.

FIG. 7(a) is a flowchart of the communication interval setting process. The communication interval setting process is a process of setting a communication interval of each pair based on the communication interval received from the wireless communication device 1M in the process of S17 and transmitting the set communication interval to the corresponding wireless communication device 1M. The communication interval setting process is performed after the foregoing process of S17 of FIG. 6 and is also performed after a process of S20 of FIG. 6 to be described below.

Hereinafter, the "corresponding ID" in the communication interval setting process is an ID acquired in the process of S12 of FIG. 6. A "target communication interval" is a communication interval received in the process of S17 when the communication interval setting process is performed after the process of S17. The case in which the communication interval setting process is performed after the process of S20 is a case in which the connection with the wireless communication device 1M is cancelled. Therefore, the initial value of the communication interval, that is, "0 ms," is set in the target communication interval.

In the communication interval setting process, it is first checked whether the initial communication interval of the corresponding ID in the communication management table 52a is 0 ms (S30). The initial value of the initial communication interval in the communication management table 52a is 0 ms. Therefore, by checking whether the initial communication interval is 0 ms, it is checked whether setting of the communication interval of the corresponding ID is completed.

When the initial communication interval of the ID acquired in the communication management table 52a is 0 ms in the process of S30 (Yes in S30), the target communication interval is set in the initial communication interval and the current communication interval of the corresponding ID of the communication management table 52a (S31). After the process of S31, a communication interval adjustment process (S32) is performed. Here, the communication interval adjustment process will be described with reference to FIG. 7(b).

Figure 7B:
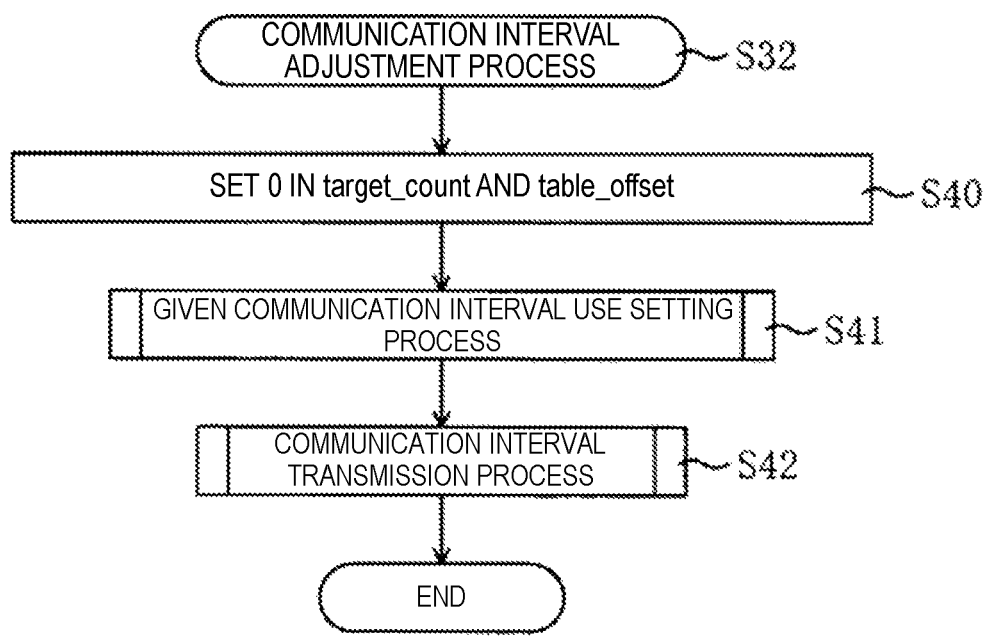

FIG. 7(b) is a flowchart of the communication interval adjustment process. In the communication interval adjustment process, 0 is set in target_count and table_offset (S40). Here, target_count is a counter variable that counts the number of wireless communication devices 1M of which the communication intervals can be changed. In addition, table_offset is a flag variable that sets whether "6 ms" stored in the beginning of the given communication interval table 51b is used as the communication interval of the pair. When "0" is set in table_offset, 6 ms is used as the communication interval of the pair. When "1" is set in table_offset, 6 ms is not used as the communication interval of the pair.

After the process of S40, a given communication interval use setting process (S41) is performed. Here, the given communication interval use setting process will be described with reference to FIG. 8.

Figure 8:
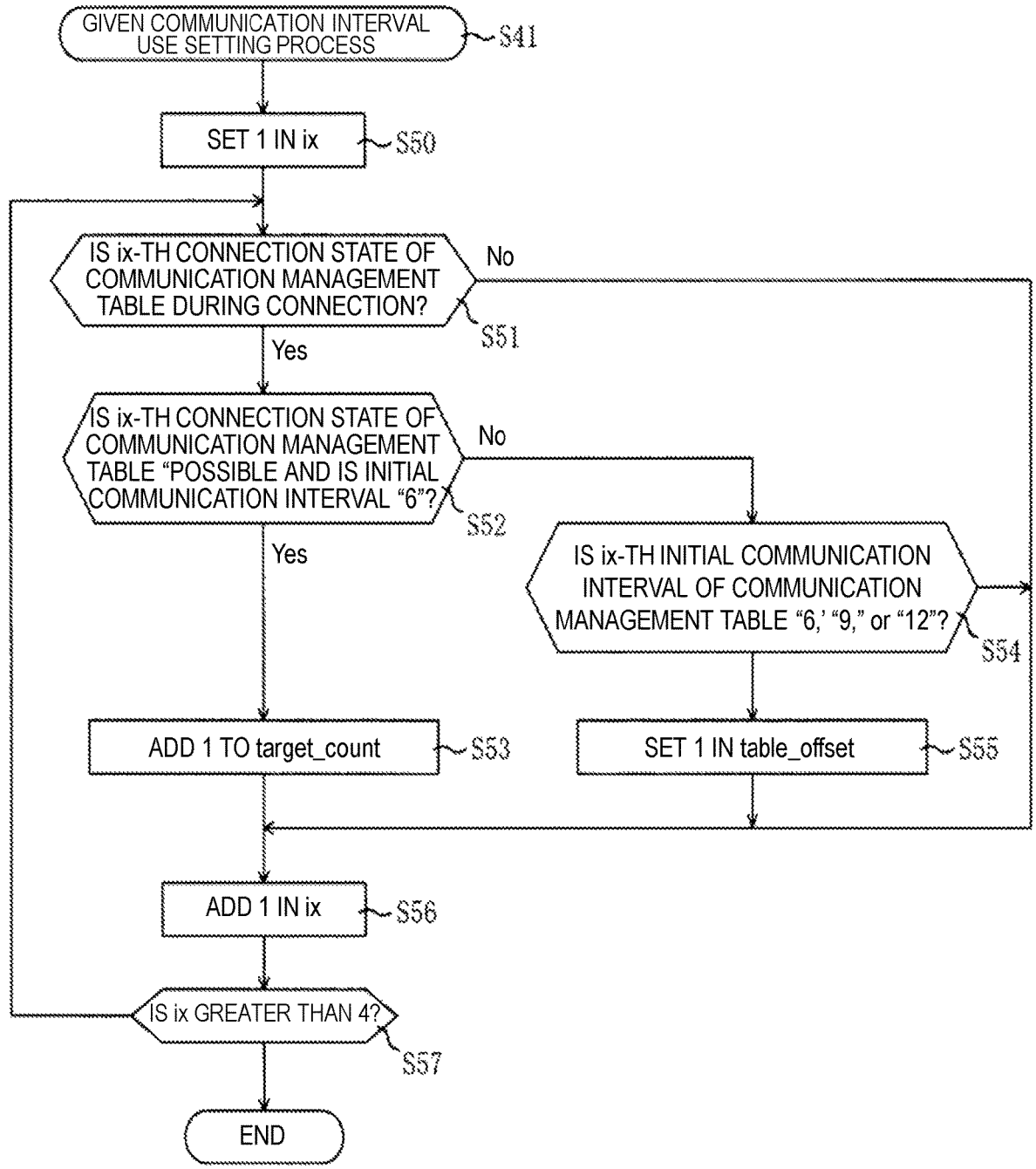
FIG. 8 is a flowchart illustrating a given communication interval use setting process.

FIG. 8 is a flowchart of the given communication interval use setting process. In the given communication interval use setting process, 1 is set in a counter variable ix (S50). The counter variable ix is a variable indicating a position at which the communication management table 52a is referred to. After the process of S50, it is checked whether an ix-th connection state of the communication management table 52a is "during connection" (S51).

When the ix-th connection state of the communication management table 52a is "during connection" in the process of S51 (Yes in S51), it is further checked whether the ix-th "change" of the communication management table 52a is "possible" and the "initial communication interval" is "6 ms" (S52). When the ix-th "change" of the communication management table 52a is "possible" and the "initial communication interval" is "6 ms" in S52 (Yes in S52), the wireless communication device 1M corresponding to the ix-th of the communication management table 52a can be determined to be a device of which the communication interval can be changed. Therefore, 1 is added to target_count (S53).

Conversely, when the ix-th "change" of the communication management table 52a is "not possible" and the "initial communication interval" is not "6 ms" in the process of S52 (No in S52), it is further checked whether the ix-th "initial communication interval" of the communication management table 52a is "6 ms," "9 ms," or "12 ms" (S54).

When the ix-th "initial communication interval" of the communication management table 52a is "6 ms," "9 ms," or "12 ms" in the process of S54 (Yes in S54), "1" is set in table_offset (S55). That is, in the pair with the wireless communication device 1M of which the ix-th communication interval of the communication management table 52a cannot be changed, it is necessary to use the initial communication interval of the wireless communication device 1M.

In this case, it is checked whether the initial communication interval of the wireless communication device 1M is "6 ms," "9 ms," or "12 ms," that is, "6 ms," "9 ms," or "12 ms" formed from "2" and/or "3" which is a prime factor of "6 ms" which is the communication interval other than a prime number of the given communication interval table 51b. In the corresponding case, "1" is set in table_offset.

For example, when "6 ms" is set in the communication interval of another pair in which the communication interval can be changed in the state in which "6 ms," "9 ms," or "12 ms" of the initial communication interval is used as the communication interval of the pair with the wireless communication device 1M of which the communication interval cannot be changed, the communication interval based on a least common multiple between the communication intervals is "6 ms," "12 ms," or "18 ms." Thus, the timings for transmission and reception of the MIDI data of two pairs coincide with each other, and thus there is concern of a communication error frequently occurring.

Accordingly, when the wireless communication device 1M of which the communication interval cannot be changed in the communication management table 52a is included, "1" is set in table_offset, and thus "6 ms" is excluded from the setting of the communication intervals of the pairs of which the communication intervals can be changed, and the communication interval based on a prime number of the given communication interval table 51b is set. Thus, since a combination of the communication intervals of two or more pairs is "6 ms" and a prime number or prime numbers, a least common multiple between the communication intervals can be set to be large. Thus, it is possible to prevent a communication error from occurring because the timings for transmission and reception in the plurality of pairs coincide with each other.

When the ix-th "connection state" of the communication management table 52a is "non-connection" (No in S51), the processes of S52 to S55 are skipped. When the ix-th "initial communication interval" of the communication management table 52a is not "6 ms," "9 ms," or "12 ms" (Yes in S54), the process of S55 is skipped.

After the processes of S51, S53, and S55, 1 is added to the counter variable ix (S56). After the process of S56, it is checked whether the counter variable ix is greater than 4 (S57). When the counter variable ix is equal to or less than 4 in the process of S57 (No in S57), the processes of S51 and the subsequent steps are repeated. When the counter variable ix is greater than 4 (Yes in S57), the given communication interval use setting process ends.

The process returns to FIG. 7(b). After the given communication interval use setting process of S41, a communication interval transmission process (S42) is performed. Here, the communication interval transmission process will be described with reference to FIG. 9.

Figure 9:
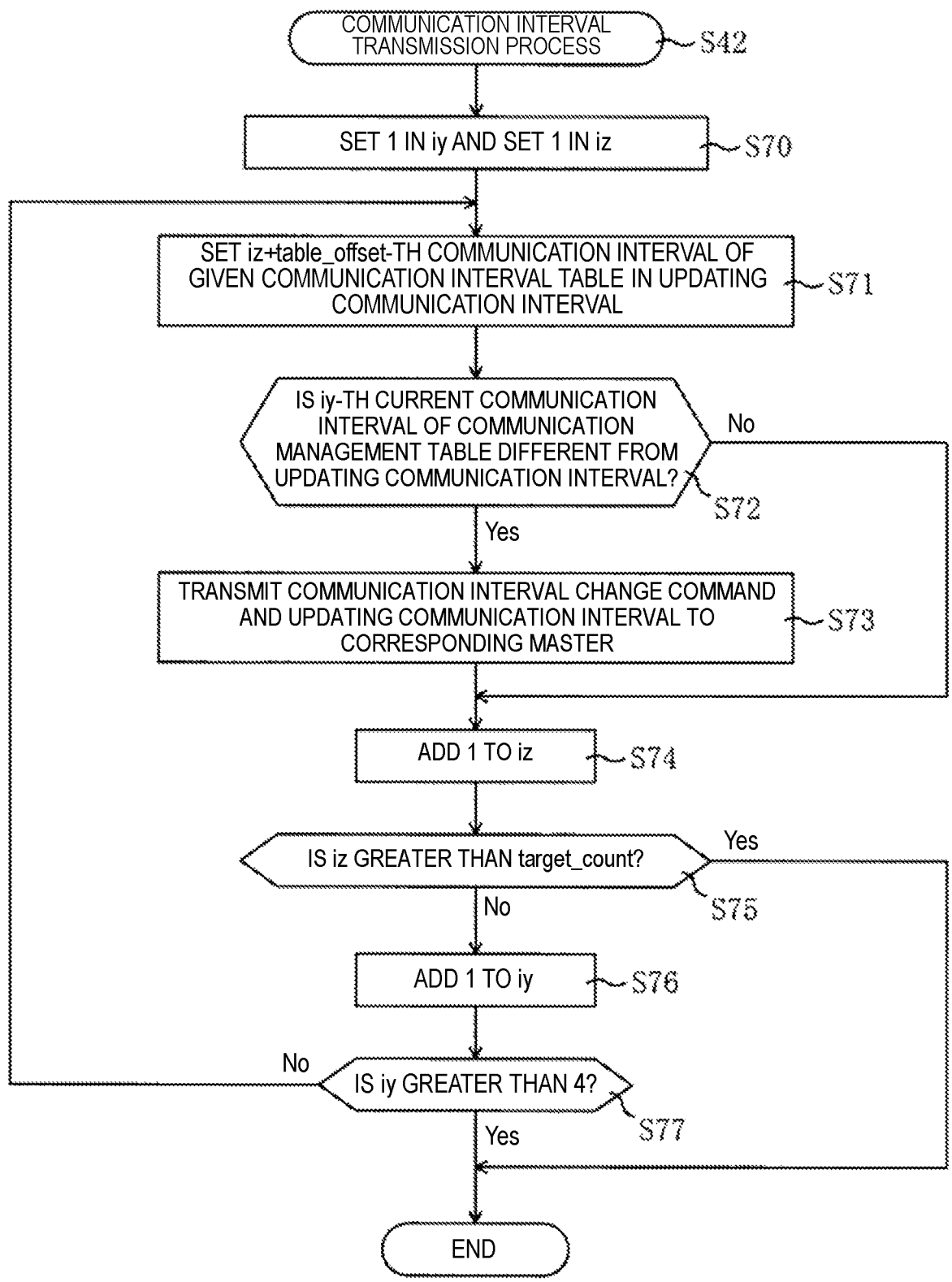
FIG. 9 is a flowchart illustrating a communication interval transmission process.

FIG. 9 is a flowchart of the communication interval transmission process. In the communication interval transmission process, 1 is set in the counter variable iy and 1 is set in a counter variable iz (S70). Here, iy is a variable indicating a position at which the communication management table 52a is referred to and iz is a counter variable that counts the number of wireless communication devices 1M of which the communication intervals can be changed in the communication interval transmission process.

After the process of S70, a "iz+table_offset"-th communication interval of the given communication interval table 51b is set (S71). That is, when the wireless communication device 1M of which the communication interval cannot be changed is not included in the communication management table 52a and 6 ms is included in the communication interval and set in table_offset, "0" is set in table_offset. Therefore, the communication intervals are acquired in succession from 6 ms which is the beginning of the given communication interval table 51b and are set as updating communication intervals. Conversely, when the wireless communication device 1M of which the communication interval cannot be changed is included in the communication management table 52a, 1 is set in table_offset. Therefore, 6 ms which is the beginning of the given communication interval table 51b is excluded in the acquisition of the communication interval. Thus, the communication intervals are acquired in succession from 7 ms which is the second communication interval of the given communication interval table 51b and are set as updating communication intervals.

After the process of S71, it is checked whether an iy-th current communication interval of the communication management table 52a is different from the updating communication interval (S72). When the iy-th current communication interval of the communication management table 52a is different from the updating communication interval in the process of S72 (Yes in S72), a communication interval change command indicating the change in the communication interval is transmitted to the corresponding wireless communication device 1M, that is, the wireless communication interval 1M with the iy-th ID of the communication management table 52a, and the updating communication interval is transmitted (S73).

Thus, the communication interval set in the wireless communication device 1S is transmitted to the paired wireless communication device 1M. The transmitted communication interval is set to the communication interval of the wireless communication device 1M in the process of S122 of the normal process of FIG. 11(b) to be described below.

When the iy-th current communication interval of the communication management table 52a is the same as the updating communication interval in the process of S72 (No in S72), the process of S73 is skipped.

After the processes of S72 and S73, 1 is added to the counter variable iz (S74). After the process of S74, it is checked whether the counter variable iz is greater than target_count (S75). When the counter variable iz is equal to or less than target_count in the process of S75 (No in S75), 1 is added to the counter variable iy (S76).

After the process of S76, it is checked whether the counter variable iy is greater than 4 (S77). When the counter variable iy is equal to or less than 4 in the process of S77 (No in S77), the processes of S71 and the subsequent steps are repeated. When the counter variable iz is greater than target_count in the process of S75 (Yes in S75) and the counter variable iy is greater than 4 in the process of S77 (Yes in S77), the communication interval transmission process ends.

The process returns to FIG. 7(b). After the communication interval setting process of S42, the communication interval adjustment process ends.

The process returns to FIG. 7(a). When the initial communication interval of the acquired ID in the communication management table 52a is not 0 ms in the process of S30 (No in S30), the target communication interval is set in the current communication interval of the corresponding ID of the communication management table 52a (S33).

As described in detail below in FIG. 11(b), when the wireless communication device 1M receives the communication interval transmitted in the process of S74 of FIG. 9, the wireless communication device 1M sets the communication interval received at the self-communication interval (that is, an operation communication interval in FIG. 11(b)), and then transmits the communication interval set in the wireless communication device 1S which is a transmission source of the communication interval. By setting the communication interval transmitted from the wireless communication device 1M to the current communication interval of the communication management table 52a in the process of S33, it is possible to set the communication interval actually used in the pair in the current communication interval.

After the processes of S32 and S33, the communication interval setting process ends.

The process returns to FIG. 6. When the communication interval is not received in the process of S17 (No in S17), the process of S18 is skipped.

After the processes of S17 and S18, it is checked whether a disconnection command is received from the wireless communication device 1M or interruption of the communication with the wireless communication device 1M is detected (S19). The disconnection command is a command transmitted from the wireless communication device 1M when the pair with the wireless communication device 1s is cancelled. The case in which the communication with the wireless communication device 1M is interrupted is a case in which the wireless communication with the wireless communication device 1M cannot be performed for a predetermined time (for example, 5 seconds) or more, such as a case in which the wireless communication device 1M is powered off without transmission of the disconnection command from the wireless communication device 1M or a case in which a wireless communication state with the wireless communication device 1M becomes bad and the communication is interrupted.

When the disconnection command is received in the process of S19 or when interruption of the communication with the wireless communication device 1M is detected (Yes in S19), each value corresponding to the ID acquired in the process of S12 in the communication management table 52a is initialized (S20) and the communication interval setting process of S18 is performed. Thus, when one pair is cancelled, the communication intervals of the remaining pairs are reset. For example, when the shortest communication interval is set in the cancelled pair, the shortest communication interval can be allocated to another pair. Thus, since the communication interval of each of the remaining pairs can be reset to a smaller value as a whole, the MIDI data in the remaining pairs can be transmitted and received quickly.

When the notification or the command is not received from the wireless communication device 1M in the process of S11 (No in S12), the disconnection command is not received in the process of S19. When interruption of the communication with the wireless communication device 1M is not detected (No in S19) or after the process of S18 subsequent to the process of S20, the processes of S10 and the subsequent steps are repeated.

The process returns to FIG. 5. When the communication mode is the master mode in the process S1 (S1: master), a master main process (S3) is performed. Here, the master main process will be described with reference to FIG. 10.

Figure 10:
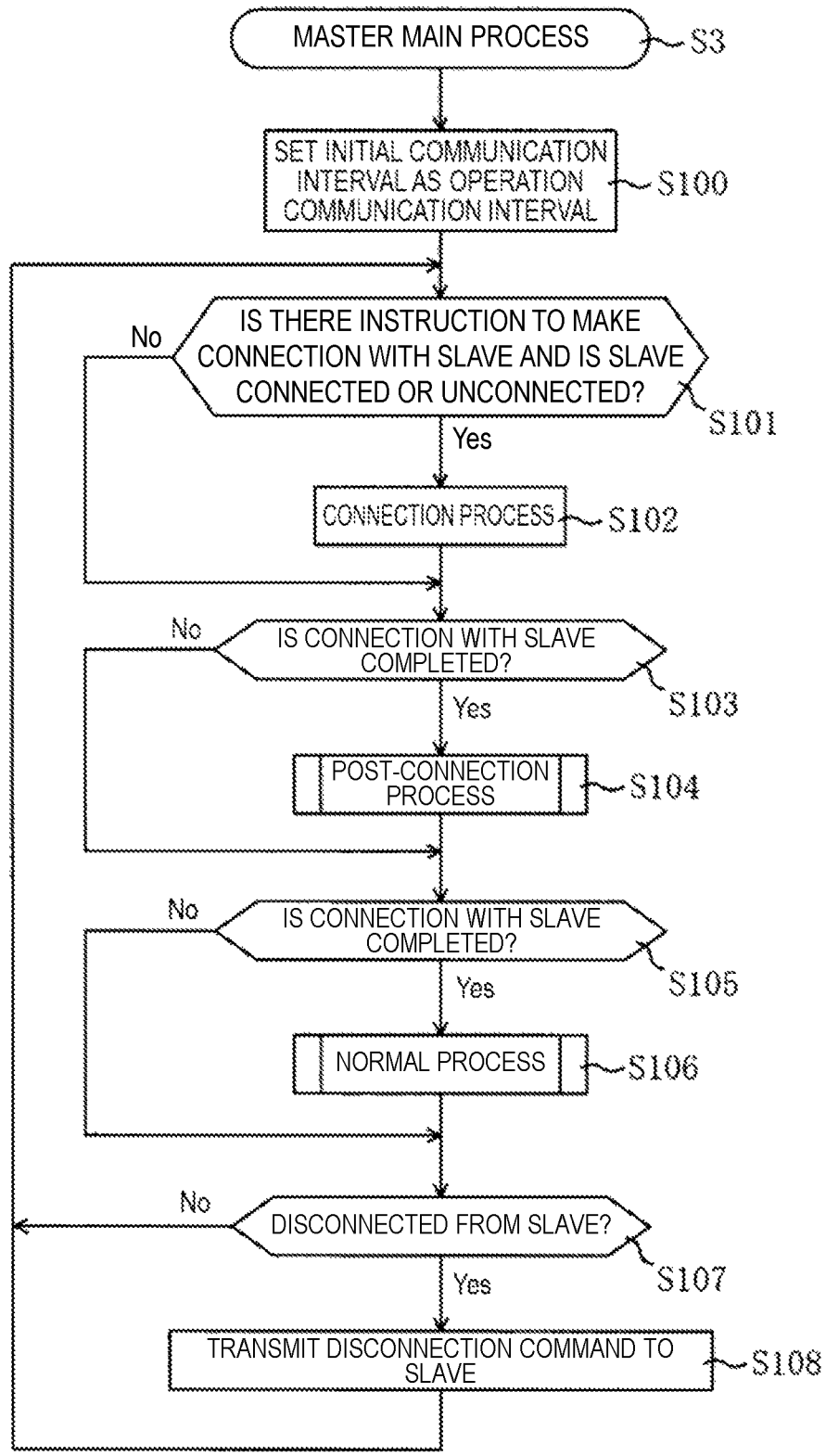
FIG. 10 is a flowchart illustrating a master main process.

FIG. 10 is a flowchart of the master main process. In the master main process, the initial communication interval set in advance in the self-device is set as an operation communication interval (S100). The operation communication interval is a communication interval used for the wireless communication device 1M to transmit and receive the MIDI data to and from the wireless communication device 1S. The process of S100 is performed only once immediately after power is supplied.

After the process of S100, a connection instruction with the wireless communication device 1S is acquired and connection or non-connection with the slave is checked (S101). In the embodiment, the connection instruction is acquired when the operation button 7 (see FIG. 1) is operated by the user. When the connection instruction is acquired and the connection with the slave is not made in the process of S101 (Yes in S101), a connection process with the wireless communication device 1S is performed (S102). Conversely, when the connection instruction is not acquired and the connection with the slave is completed in the process of S101 (No in S101), the process of S102 is skipped.

After the processes of S101 and S102, it is checked whether the connection with the wireless communication device 1S is completed (S103). When the connection with another wireless communication device 1 in the slave mode is completed in the process of S103 (Yes in S103), a post-connection process (S104) is performed. When the connection with the wireless communication device 1S is not completed in the process of S103 (No in S103), the post-connection process of S104 is skipped. Here, the post-connection process of S104 will be described with reference to FIG. 11(a).

Figure 11A:
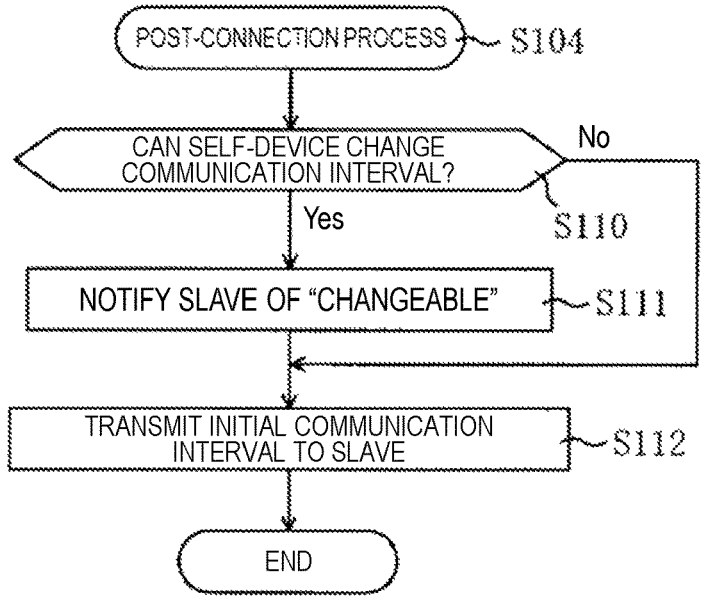
FIG. 11(a) is a flowchart illustrating a post-connection process and FIG. 11(b) is a flowchart illustrating a normal process.

FIG. 11(a) is a flowchart of the post-connection process. In the post-connection process, it is first checked whether the self-device can change the communication interval (S110). When the self-device can change the communication interval in the process of S110, the wireless communication device 1S is notified that the communication interval is "changeable" (S111). The wireless communication device 1S receives the notification, the corresponding wireless communication device 1M is set to be "changeable" in the communication management table 52a in the processes of S15 and S16 of FIG. 6.

When the self-device cannot change the communication interval in the process of S110 (No in S110), the process of S111 is skipped. After the processes of S110 and S111, the initial communication interval preset in the self-device is transmitted to the wireless communication device 1S (S112). After the process of S112, the post-connection process ends.

The process returns to FIG. 10. After the post-connection process of S103 and S104, it is checked whether the connection with the slave is completed (S105). When the connection with the slave is completed in the process of S105 (Yes in S105), the normal process (S106) is performed. When the connection with the slave is not made (No in S105), the normal process of S106 is skipped. Here, the normal process of S106 will be described with reference to FIG. 11(b).

Figure 11B:
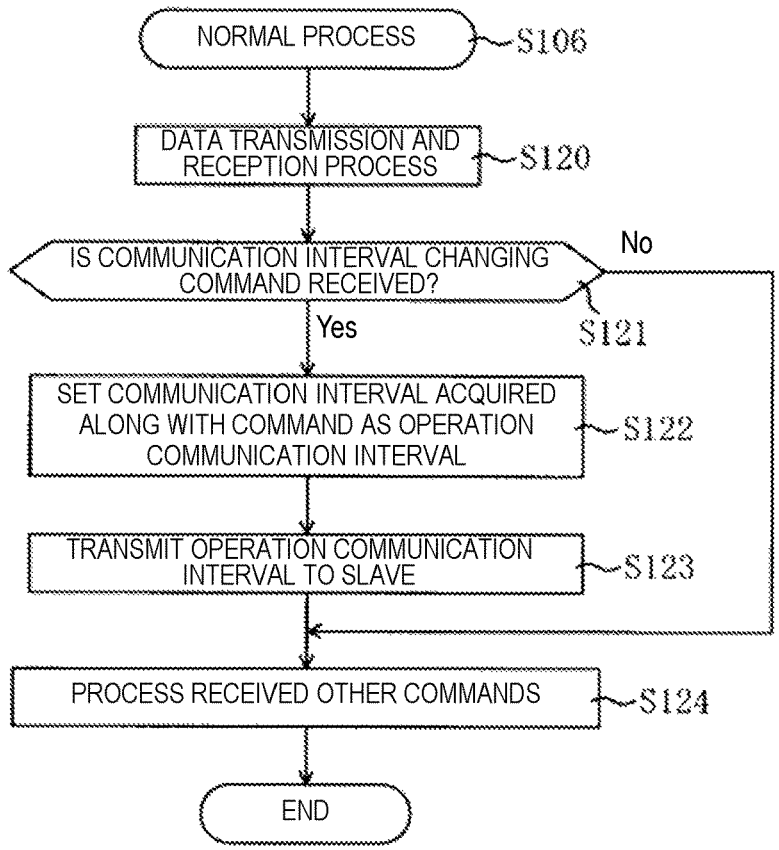

FIG. 11(b) is a flowchart of the normal process. In the normal process, a data transmission and reception process is first performed (S120). In the data transmission and reception process in the master mode, like the process of S10 of FIG. 6 in the slave mode, the MIDI data received from the paired wireless communication device 1S is transmitted to the MIDI input terminal 103 of the electronic musical instrument 100 via the output terminal 8 (see FIG. 4(a)) and the MIDI data received from the MIDI output terminal 102 of the electronic musical instrument 100 is stored in the transmission buffer (not illustrated) via the input terminal 3. The MIDI data stored in the transmission buffer is transmitted to the wireless communication device 1S in the transmission and reception process performed at each communication interval. In the data transmission and reception process, the notification or the command from the wireless communication device 1S other than the MIDI data is also transmitted and received.

After the process of S120, it is checked whether a communication interval changing command is received from the wireless communication device 1S (S121). When the communication interval changing command is received in the process of S121 (Yes in S121), the communication interval received along with the command is set as an operation communication interval (S122) and the set operation communication interval is transmitted to the wireless communication device 1S (S123). Thus, the communication interval set and transmitted from the wireless communication device 1S is received by the wireless communication device 1M, and the MIDI data is transmitted and received by the pair at the received communication interval.

When the communication interval changing command is not received in the process of S121 (No in S121), the processes of S122 and S123 are skipped. After the processes of S121 and S123, other commands or notifications received from the wireless communication device 1S are processed (S124), and then the normal process ends.

The process returns to FIG. 10. After the processes of S105 and S106, it is checked whether a disconnection instruction is given (S107). In the embodiment, the disconnection instruction is acquired when the operation button 7 (see FIG. 1) is operated by the user.

When the disconnection instruction is given in the process of S107 (Yes in S107), a disconnection command is transmitted to the wireless communication device 1S (S108). Thus, in the wireless communication device 1S, initialization of each value of the corresponding ID in the communication management table 52a and resetting of the communication interval are performed in S19 and S20 of FIG. 6 and the subsequently performed process of S18. When the disconnection instruction is not given in the process of S107 (No in S107), the process of S108 is skipped. After the processes of S107 and S108, the processes of S101 and the subsequent steps are repeated.

The process returns to FIG. 5. After the processes of S2 and S3, the main process ends.

As described above, in the wireless communication device 1 according to the embodiment, the communication interval of each pair is set to the different time interval in the wireless communication device 1S and is transmitted to the corresponding wireless communication device 1M. Accordingly, since the communication interval of each pair can be different, the timings for transmission and reception of the MIDI data in each pair can be staggered. Thus, it is possible to prevent a communication error from occurring because the timings for transmission and reception of the MIDI data in the plurality of pairs coincide with each other.

When the timings for transmission and reception of the MIDI data in two or more pairs coincide with each other, the subsequent timings for transmission and reception can be different timings. Thus, since it is possible to prevent a communication error from occurring in succession because the timings for transmission and reception of the MIDI data in the two or more pairs coincide with each other, the MIDI data can be transmitted and received without delay.

The communication interval of each pair is set in the wireless communication device 1S in which the communication mode is the slave mode is set and transmitted to the wireless communication devices 1M in the master mode. That is, in the wireless communication device 1S instructed from all the wireless communication devices 1M, the communication interval of each pair is set. Accordingly, it is not necessary for the other wireless communication devices 1M to mutually check whether the communication interval of each pair is set to the different time interval in the wireless communication device 1M. Thus, it is possible to set the different communication intervals between pairs accurately and easily.

The foregoing embodiment has been described above, but it is possible to easily predict that various modifications and changes can be made.

In the foregoing embodiment, in the given communication interval table 51b, the initial communication interval of the wireless communication device 1M in which "change" is "possible" and the communication interval based on the prime number are stored, as described above. However, the disclosure is not limited thereto. For example, the initial communication interval and communication intervals based on odd numbers may be stored in the given communication interval table 51b, or the initial communication interval and communication intervals based on random numbers may be stored in the given communication interval table 51b. In this case, the communication intervals stored along with the initial communication interval are preferably small time intervals related to the initial communication interval, for example, time intervals that have no common small prime factor to the initial communication interval or time intervals in which a least common multiple with the initial communication interval is large. Further, even in this case, the communication intervals in accordance with a shorter time interval are preferably set in the given communication interval table 51b.

A communication amount of the MIDI data of each pair may be measured for a given time (for example, 10 minutes) and a communication interval with the corresponding wireless communication device 1M may be set in accordance with the measured communication amount. Specifically, for example, in the wireless communication device 1M corresponding to the pair in which the communication amount is large, a communication interval of a short time interval is set as a current communication interval of the communication management table 52a. In the wireless communication device 1M corresponding to the pair in which the communication amount is small, a communication interval of a long time interval is set as a current communication interval of the communication management table 52a. The communication interval set in accordance with the communication amount and the communication interval changing command may be transmitted to the corresponding wireless communication device 1M.

In the foregoing embodiment, in the process of S110 of the post-connection process of FIG. 11(a), it is checked whether the self-device (the wireless communication device 1M) can change the communication interval. However, the disclosure is not limited thereto. When it is ascertained in advance that the self-device can change the communication interval, the process of S110 may be omitted and the subsequent processes of S111 and S112 may be performed. Conversely, when it is ascertained in advance that the self-device cannot change the communication interval, the processes of S110 and S111 may be omitted and the subsequent process of S112 may be performed.

In the foregoing embodiment, in the process of S54 of FIG. 8, the ix-th initial communication interval of the communication management table 52a is compared with "6 ms," "9 ms," or "12 ms" which is the prime factor of the communication interval "6 ms" stored in the given communication interval table 51b, as described above. However, the comparison with the ix-th initial communication interval of the communication management table 52a is not limited thereto. For example, the initial communication interval may be compared with a communication interval based on a prime number stored in the given communication interval table 51b, or the communication interval based on the prime number stored in the given communication interval table 51b may further be compared to the communication interval set as the prime factor.

In the foregoing embodiment, the communication interval of each pair is set in the wireless communication device 1S, as described above. However, the disclosure is not limited thereto. The communication interval of each pair may be set in the wireless communication device 1M. In this case, of the plurality of wireless communication devices 1M, the wireless communication device 1M in which the communication interval is set may be determined in advance and the communication interval set in the wireless communication device 1M may be transmitted to the wireless communication devices 1M and the wireless communication device 1S.

In the foregoing embodiment, the case in which the plurality of wireless communication devices 1M is connected to one wireless communication device 1S has been exemplified, but the disclosure is not limited thereto. For example, one wireless communication device 1M may be connected to the plurality of wireless communication devices 1S.

In the foregoing embodiment, the wireless module 5 communicates with the other wireless communication devices 1 through wireless communication, as described above. However, the communication scheme with the other wireless communication devices 1 is not limited to the wireless communication. The wireless communication devices 1 may be connected to each other by cables such as LAN cables or USB cables and the communication with the other wireless communication devices 1 may be performed through wired communication using the LAN, the USB, or the like.

In the foregoing embodiment, the wireless communication device 1 is connected to the MIDI output terminal 102 and the MIDI input terminal 103 of the electronic musical instrument 100 via the input terminal 3 and the output terminal 8, but the disclosure is not limited thereto. The wireless communication device 1 may be connected to another communication terminal such as a USB of the electronic musical instrument 100 and the MIDI data may be input and output between the wireless communication device 1 and the electronic musical instrument 100 via the communication terminal. The wireless communication device 1 may be included in, for example, the electronic musical instrument 100 or an electronic device such as a PC or a portable terminal configured to input and output the MIDI data without being limited to the connection with the electronic musical instrument 100.

The numerical values exemplified in the foregoing embodiment are exemplary and other numerical values are, of course, adopted.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wireless communication device that is connected to an electronic musical instrument and transmits and receives MIDI data input to and output from the electronic musical instrument to and from other wireless communication devices paired through wireless communication at a predetermined communication interval,
    wherein a pair of the wireless communication is formed between the wireless communication device and each of a plurality of the other wireless communication devices, and
    wherein the wireless communication device comprises:
        a communication interval setting part configured to set a communication interval of each pair to a different time interval;
        a communication interval transmission part configured to transmit the communication intervals set by the communication interval setting part to the corresponding other wireless communication devices; and
        a resetting part configured to execute the communication interval setting part again when one of the pairs is cancelled to reset the communication interval of each pair, excluding the cancelled pair, to the different time interval.

2. The wireless communication device according to claim 1, wherein the communication interval setting part sets the communication interval of each pair to a time interval based on a prime number.

3. The wireless communication device according to claim 1, further comprising:
    a change setting acquisition part configured to acquire whether it is possible to change the communication intervals in the other wireless communication devices; and
    an interval acquisition part configured to acquire the communication intervals set in the other wireless communication devices,
    wherein, when the plurality of other wireless communication devices includes a wireless communication device in which the communication interval is unchangeable, the communication interval setting part excludes a pair with the other wireless communication device from a target for setting the communication interval and excludes the communication interval set in the other wireless communication device in setting of the communication intervals of pairs in which the communication intervals are settable.

4. The wireless communication device according to claim 1, further comprising:
    a change setting acquisition part configured to acquire whether it is possible to change the communication intervals in the other wireless communication devices; and
    an interval acquisition part configured to acquire the communication intervals set in the other wireless communication devices,
    wherein, when the plurality of other wireless communication devices includes a wireless communication device in which the communication interval is unchangeable, the communication interval setting part excludes a pair with the other wireless communication device from a target for setting the communication interval and excludes the communication interval based on a prime factor of the communication interval set in the other wireless communication device in setting of the communication intervals of pairs in which the communication intervals are settable.

5. The wireless communication device according to claim 2, further comprising:
    a change setting acquisition part configured to acquire whether it is possible to change the communication intervals in the other wireless communication devices; and
    an interval acquisition part configured to acquire the communication intervals set in the other wireless communication devices,
    wherein, when the plurality of other wireless communication devices includes a wireless communication device in which the communication interval is unchangeable, the communication interval setting part excludes a pair with the other wireless communication device from a target for setting the communication interval and excludes the communication interval set in the other wireless communication device in setting of the communication intervals of pairs in which the communication intervals are settable.

6. The wireless communication device according to claim 2, further comprising:
    a change setting acquisition part configured to acquire whether it is possible to change the communication intervals in the other wireless communication devices; and
    an interval acquisition part configured to acquire the communication intervals set in the other wireless communication devices,
    wherein, when the plurality of other wireless communication devices includes a wireless communication device in which the communication interval is unchangeable, the communication interval setting part excludes a pair with the other wireless communication device from a target for setting the communication interval and excludes the communication interval based on a prime factor of the communication interval set in the other wireless communication device in setting of the communication intervals of pairs in which the communication intervals are settable.

7. The wireless communication device according to claim 1, wherein the communication interval setting part sets the communication intervals of the pairs in an increasing order of the different time intervals.

8. The wireless communication device according to claim 1,
    wherein a communication mode is provided in which a master mode in which an instruction is given to the wireless communication device and a slave mode in which a response is made in accordance with the instruction from the wireless communication device in which the master mode is set are switchable between,
wherein the communication interval setting part sets the communication interval of each pair to different time intervals when the communication mode is the slave mode, and
wherein the communication interval transmission part transmits the communication interval set in the communication interval setting part to the other wireless communication devices in which the corresponding communication mode is the master mode.

9. An electronic device comprising:
the wireless communication device according to claim 1.

10. A wireless communication method performed by a wireless communication device that is connected to an electronic musical instrument and transmits and receives MIDI data input to and output from the electronic musical instrument to and from other wireless communication devices paired through wireless communication at a predetermined communication interval,
wherein a pair of the wireless communication is formed between the wireless communication device and each of a plurality of the other wireless communication devices, and
wherein the method comprises:
setting a communication interval of each pair to a different time interval;
transmitting the communication interval set in the setting of the communication interval to the corresponding other wireless communication devices; and
setting the communication interval of each pair again when one of the pairs is cancelled to reset the communication interval of each pair, excluding the cancelled pair, to the different time interval.

11. A wireless communication device that is a first wireless communication device that is connected to a first electronic musical instrument and transmits and receives MIDI data input to and output from the first electronic musical instrument at a predetermined communication interval through wireless communication,
wherein the first wireless communication device being connected to a second wireless communication device that is connected to a second electronic musical instrument and transmits and receives MIDI data input to and output from the second electronic musical instrument to and from the first wireless communication device at a predetermined communication interval through wireless communication, and
the first wireless communication device being connected to a third wireless communication device that is connected to a third electronic musical instrument and transmits and receives MIDI data input to and output from the third electronic musical instrument to and from the first wireless communication device at a predetermined communication interval through wireless communication, and
wherein the wireless communication device comprises:
a communication interval setting part configured to set the communication interval between the first and second wireless communication devices and the communication interval between the first and third wireless communication devices to different time intervals;
a communication interval transmission part configured to transmit the communication intervals set by the communication interval setting part to the corresponding second and third wireless communication devices; and
a resetting part configured to execute the communication interval setting part again when the connection to the second or third wireless communication devices is cancelled to reset the communication interval between the first and second wireless communication devices and the communication interval.

12. The wireless communication device according to claim 11, wherein the communication interval setting part sets the communication interval between the first and second wireless communication devices and the communication interval between the first and third wireless communication devices to a time interval based on a prime number.

13. The wireless communication device according to claim 11, further comprising:
a change setting acquisition part configured to acquire whether it is possible to change the communication intervals in the second and third wireless communication devices; and
an interval acquisition part configured to acquire the communication intervals set in the second and third wireless communication devices,
wherein, when the second and third wireless communication devices includes an unchangeable wireless communication device in which the communication interval is unchangeable, the communication interval setting part excludes a pair with the unchangeable wireless communication device from a target for setting the communication interval and excludes the communication interval set in the unchangeable wireless communication device in setting of the communication intervals of pairs in which the communication intervals are settable.

14. The wireless communication device according to claim 11, further comprising:
a change setting acquisition part configured to acquire whether it is possible to change the communication intervals in the second and third wireless communication devices; and
an interval acquisition part configured to acquire the communication intervals set in the second and third wireless communication devices,
wherein, when the second and third wireless communication devices includes an unchangeable wireless communication device in which the communication interval is unchangeable, the communication interval setting part excludes a pair with the unchangeable wireless communication device from a target for setting the communication interval and excludes the communication interval based on a prime factor of the communication interval set in the unchangeable wireless communication device in setting of the communication intervals of pairs in which the communication intervals are settable.

15. The wireless communication device according to claim 12, further comprising:
a change setting acquisition part configured to acquire whether it is possible to change the communication intervals in the second and third wireless communication devices; and
an interval acquisition part configured to acquire the communication intervals set in the second and third wireless communication devices,
wherein, when the second and third wireless communication devices includes an unchangeable wireless communication device in which the communication interval is unchangeable, the communication interval setting part excludes a pair with the unchangeable wireless communication device from a target for setting the communication interval and excludes the communication interval set in the unchangeable wireless communication device in setting of the communication intervals of pairs in which the communication intervals are settable.

16. The wireless communication device according to claim 12, further comprising:
   a change setting acquisition part configured to acquire whether it is possible to change the communication intervals in the second and third wireless communication devices; and
   an interval acquisition part configured to acquire the communication intervals set in the second and third wireless communication devices,
   wherein, when the second and third wireless communication devices includes an unchangeable wireless communication device in which the communication interval is unchangeable, the communication interval setting part excludes a pair with the unchangeable wireless communication device from a target for setting the communication interval and excludes the communication interval based on a prime factor of the communication interval set in the unchangeable wireless communication device in setting of the communication intervals of pairs in which the communication intervals are settable.

17. The wireless communication device according to claim 11, wherein the communication interval setting part sets the communication intervals of a plurality of connections to the second and third wireless communication devices in an increasing order of the different time intervals.

18. The wireless communication device according to claim 11, wherein a communication mode is provided in which a master mode in which an instruction is given to the first wireless communication device and a slave mode in which a response is made in accordance with the instruction from the second and third wireless communication device in which the master mode is set are switchable between,
   wherein the communication interval setting part sets the communication interval between the first and second wireless communication devices and the communication interval between the first and third wireless communication devices to different time intervals when the communication mode is the slave mode, and
   wherein the communication interval transmission part transmits the communication interval set in the communication interval setting part to the second and third wireless communication devices in which the corresponding communication mode is the master mode.

19. The wireless communication device according to claim 1, wherein the resetting part is configured to reset the communication interval of each pair, excluding the cancelled pair, to a smaller value.

20. The wireless communication method according to claim 10, wherein reset the communication interval of each pair, excluding the cancelled pair, to the different time interval comprises resetting the communication interval of each pair to a smaller value.

\* \* \* \* \*